United States Patent [19]

Belthle

[11] 4,382,253
[45] May 3, 1983

[54] METHOD FOR MEASURING ABRASION IN A GRINDING OPERATION AND APPARATUS THEREFOR

[75] Inventor: Heinz Belthle, Aichwald, Fed. Rep. of Germany

[73] Assignee: FORTUNA-WERKE Maschinenfabrik GmbH, Stuttgart, Fed. Rep. of Germany

[21] Appl. No.: 120,177

[22] Filed: Feb. 11, 1980

[30] Foreign Application Priority Data

Mar. 2, 1979 [DE] Fed. Rep. of Germany ....... 2908114

[51] Int. Cl.³ ............................................. G08B 21/00
[52] U.S. Cl. ....................................... 340/680; 73/1 J; 73/7
[58] Field of Search ...................... 340/52 B, 514, 540, 340/679, 682, 680; 73/1 J, 7; 200/61.4, 61.58, 61.44; 116/208

[56] References Cited

U.S. PATENT DOCUMENTS 2,267,559 12/1941 Foster ................................. 200/61.4
3,321,045 5/1967 Veilleux ................................ 116/208

FOREIGN PATENT DOCUMENTS 685855 9/1979 U.S.S.R. .............................. 340/682

Primary Examiner—Kyle L. Howell
Assistant Examiner—Denis E. Corr
Attorney, Agent, or Firm—Martin A. Farber

[57] ABSTRACT

A method and apparatus for measuring the abrasion depth of an outer surface of a substantially stationary body such as a tool which rests in working position against a rotating body such as a shaft to be ground. A measurement pin is inserted in a first direction into a measurement sleeve arranged in the stationary body, displaceably in the sleeve by action of one end of the pin against the shaft. During the grinding operation as a result of the abrasion on the surface of the stationary body the measurement pin is gradually inserted further into the sleeve and upon exceeding a distance of insertion corresponding to a predetermined abrasion on the surface of the stationary body which requires replacement of the stationary body the other end of the measurement pin contracts against an electric contact disposed inside the sleeve so as to provide an alarm via an electric circuit of an indicating device. In a path detection system a desired reference length of an end length of the measurement pin is stored. The path detection system measures and compares this end length moving past measurement feelers with the reference length stored in the path detection system. An alarm is initiated by the path detection system if the measured end length of the measurement pin is the same as or shorter than the stored reference length.

5 Claims, 4 Drawing Figures

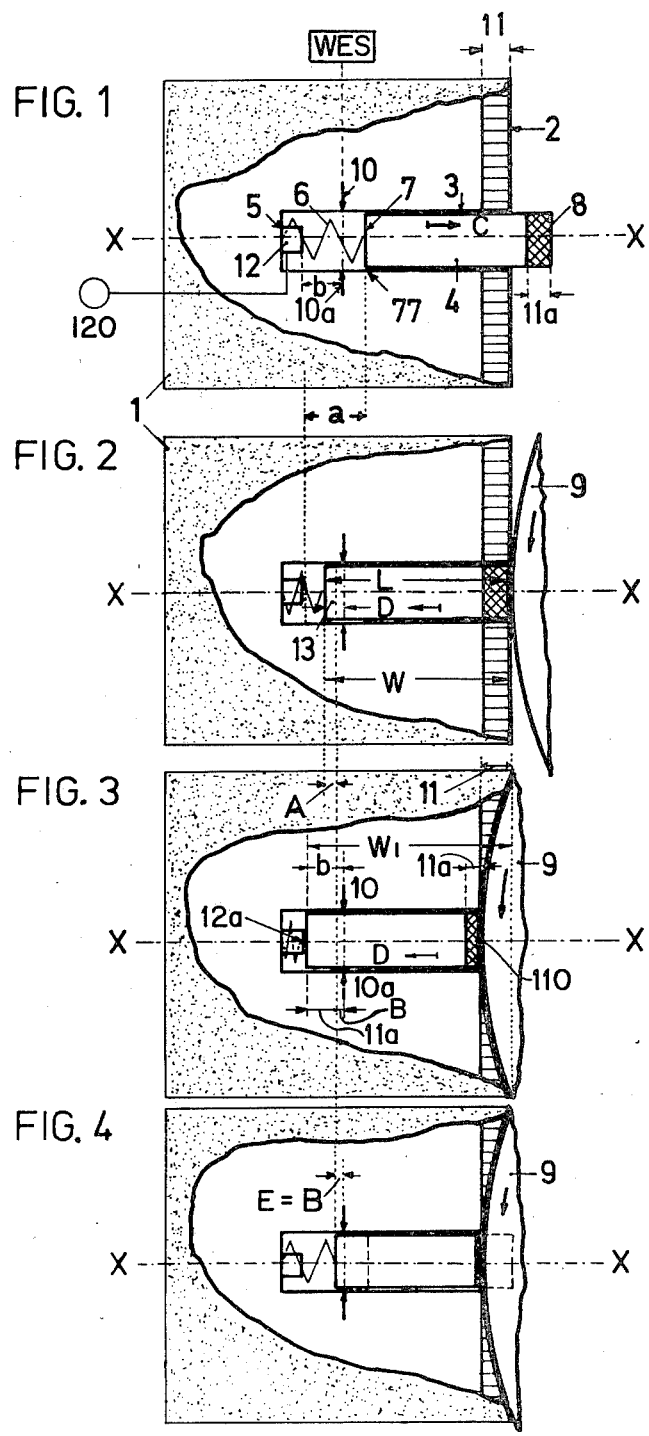

METHOD FOR MEASURING ABRASION IN A GRINDING OPERATION AND APPARATUS THEREFOR

The invention relates to a process for measuring the abrasion or the depth of the abrasion on one or more faces of a generally stationary body, for example of a tool, placed in a working position against a turning body as for example of a workpiece such as a shaft or the like on which grinding is to take place.

Faces on a turning workpiece, which are forced against a stationary body, as for example a body in the form of a tool, undergo wear by abrasion. Because of the decrease in size of the faces, taking place all the time, the tool becomes shorter and shorter. In the case of a high pushing force, necessary for the working operation in question, as for example in the case of the jaws of a steady for axially supporting a turning shaft or the like to undergo grinding, this decrease in size is furthermore relatively great. More specially in the case of the jaws of steadies a decrease in length of the jaws even by only a few microns will make the grinding operation impossible in the case of a shaft or the like. For this reason it is necessary to give careful attention to the face parts undergoing abrasion and, for this reason, responsible for the jaws of the steady becoming shorter. For these reasons a suggestion has been made earlier for coating the faces in question with a low-abrasive coating. However, even with such a coating, it will still be necessary from time to time for the steady jaws to be replaced by new ones, the insertion of such new jaws taking place in line with past experience, in which respect the nature of the material, the size and other properties of the workpiece to be machined are important. In this respect the experience of the workers using the machine in question is more specially important.

In view of these conditions, one purpose of the present invention is to provide a process and an apparatus for performing the process making it possible for the abrasion, and, for this reason, the degree by which a tool becomes shorter in relation to a workpiece—and, if necessary, the other way round—may be completely automatically sensed or measured. This without having to make use of the experience and knowledge of the worker using the machine, so that when the abrasion on a part to be measured is greater than a certain lowest amount, for example on a tool, electrical pulses or other electrical signals are produced for optical or acoustic warning and/or for further switching operations, as for example switching off.

In the process of the invention this is made possible, because at least one part of the face is moved in at an angle in relation to the face to be measured into the inside of the stationary body and on being moved greater than a certain amount, an electrical signal is produced. On moving the face part, which has been moved into the inside of the unmoving body, into its starting position, the distance moved back by the part of the face in the opposite direction of motion is measured and, if this is less than a certain rated distance, in the same way an electrical signal is produced. It is best for the face part to be moved in at generally a right angle to the face of the stationary body. The electrical signal is produced when the motion is greater than a certain rated distance of moving in by the face part through its lower face. When the distance moved is less than a certain backward motion distance as the face is moved backwards into its starting position, the end, nearest to the sleeve, of the face part is responsible for producing the signal.

The apparatus for performing the process of the invention is characterised by a measuring sleeve, which is fixed inside a tool normally to its outer face. A face part which is within the tool and acted upon by a spring, is able to be moved axially, has its free end projecting out past the outer face and is designed as a measuring pin. This face part may be pushed in by a turning workpiece on the stationary tool against the force of a spring into the measuring sleeve. If the abrasion of the outer face of the tool is overly great, it is responsible for operating a contact placed in the measuring sleeve. A by a distance measuring system, placed on the measuring sleeve, has measuring feelers which are used for measuring a certain true-length of a moved past end, on the side of the sleeve, of the measuring pin as the latter slides back into its starting position for a comparison with a desired length of the end part.

A detailed account will now be given of the invention using a working example to be seen in the drawings of the specification.

FIG. 1 is a broken-away part view of a non-moving body with a face part, taking the form of a measuring pin and able to be moved axially in the pin, in section.

FIG. 2 is a part view of a non-moving body as in FIG. 1, which in the working position contacts touching a body.

FIG. 3 is a view of the system of FIG. 2 with the outer face, which has undergone abrasion by the turning body, of the non-moving body together with the outer face of the face part and of the outer face of the measuring pin, and FIG. 4 is a view as in FIG. 3 with outer faces, which have undergone abrasion by the turning body, that is not only in the case of the non-moving body, but furthermore of the measuring pin in the starting position of the latter.

In one part a non-moving body, which in the present example is the tool, which is to be seen in a part view of the jaw 1 of a steady, in its inner part, normal to the outer face 2 undergoing abrasion, a measuring sleeve 3 is disposed. In the latter a face part of the overall outer face undergoing abrasion is formed as a measuring pin 4. This measuring pin is acted upon by a spring and may be moved axially in one direction X—X. For this purpose at the end face 5 concentrically with respect to the measuring sleeve, a compression spring 6 is placed forcing the end 7, nearest to the sleeve, of the measuring pin springingly outwards, so that its free end 8, which is nearest to the outer face, extends past the abrasion face 2 in the starting position. A workpiece, in the present case a shaft 9 to undergo grinding, and which is supported by the jaws of the steady (see FIG. 2) has the effect of forcing the measuring pin, against the spring force, into the sleeve 3 without, beforehand, moving any distance greater than a rated moving in distance a. At the same time the end 7 of the measuring pin, moving along a true-length A goes past the measuring feelers 10, placed on the measuring sleeve, of a path detection system or a distance measuring system WES. On clearing the tool from the workpiece, the measuring pin goes back into its starting position. Because, by displacing the measuring pin, the distance moved is not greater than the rated distances (a) or less then (A), no electrical signal is produced by the switching system 120 used for this purpose. The jaw is worn away by the abrasion distance 11 as a result of the abrasion taking place with time because of the turning of the workpiece, on the tool forced against the workpiece, that is abrasion of the jaw 1 of the steady, at the axis X—X of the measuring pin. In this respect furthermore the free end 8 of the measuring pin undergoes abrasion and, for this reason, it will become shorter as well. In FIG. 3, in which a limiting case is to be seen, the abrasion of the jaw of the steady is so great that the measuring pin 4 is pushed out past the pushing in distance a into the sleeve, so that it contacts an electric contact 12 placed at the end of the metal sleeve 3 and, for this reason, an electrical signal will be produced in the electric switching system 120, with the outcome that the overly great abrasion and the decrease in the length of the tool dependent on it, will be marked by a light and/or sound signal. On moving the measuring pin back into its starting position (see FIG. 2), by the distance measuring system WES, the actual length A (that is the stretch of an end length cut 13 of the measuring pin, whch end length 13 is moved past the measuring feelers 10 up to the end 7 or the end edge 77 of the measuring pin is measured in comparison with a desired-length (that is the smallest length which is moved past it or is to be moved past it). This is to be seen in FIG. 4, in which it is made clear that the measuring pin at its free end 8 has undergone such a degree of abrasion that its complete length, and, for this reason as well, the desired-length B (to be moved past the feelers 10) of the end part 13 has become much shorter to such an extent that on movement past the measuring feelers the distance moved will be less than this desired-length B. This fact is sent to the distance measuring system WES and the system is responsible for giving a light or sound signal in the same way.

Using the process and apparatus of which an account has been given, it is possible to get a direct warning when a tool becomes shorter by a distance of only some microns, if such a shorter form of the tool would have an undesired effect on the machining of a workpiece. However, as has been made clear, in addition to abrasion or the depth of abrasion on the tool itself—in the present case the jaw of a steady —the invention may furthermore be used in the case of any additional part of the apparatus as for example in the case of the tool, as an auxiliary system for measuring and giving a warning signal. This is important in the present case for stopping any warning in error, which might be caused by the measuring system itself and not by abrasion. The process may, however, be useful in other cases if for example the abrasion at a number of faces is to be measured, of which at least one is then to be able to be moved in relation to a stationary face, generally normally to its outer face.

It is furthermore to be noted that not only the outer face 2 of the tool, but furthermore the end 8, projecting to a higher level than this outer face of the tool, of the measuring pin 7 are coated with a very low abrasive material, that is to say with an abrasion-proof material.

It is furthermore to be noted that the measuring feelers 10 may be designed for being worked by a mechanical contact or electrically, that is to say inductively or capacitively.

What we claim is:

1. In a grinding operation a method of measuring the abrasion depth of at least one outer surface of a substantially stationary body such as a tool which rests in working position against a rotating body for example a rotating workpiece such as a shaft to be ground, comprising the steps of moving a measurement pin in a first direction D in a measurement sleeve, which sleeve is arranged in the stationary body, by the shaft into a starting position by pressing on one end of the measurement pin, said measurement pin defines a length L, W in said starting position, such that another end of the measurement pin is spaced apart from an electric contact disposed inside the sleeve, during the grinding operation, as a result of the abrasion on said surface of the stationary body, on said one end of said measurement pin and on said sleeve, by the shaft pressing on said surface, on said one end of the measurement pin and on said sleeve, continuously further moving the measurement pin in the first direction in the sleeve such that upon traversing a distance (cf. W1), the latter distance being predetermined such that it is traversed when the surface of the stationary body has been completely abraded to a predetermined amount so as to be required to be replaced, said another end of the measurement pin contacts against the electric contact so as to provide an alarm via an electric circuit of an indicating device, and measuring the abrasion on said one end of said measurement pin, comprising the steps of storing in a path detection system a desired reference length B of an end length (cf. 13) of the measurement pin, before a start of a new grinding operation removing the shaft from contacting the stationary body and said measurement pin and moving the measurement pin back in a second direction opposite to said first direction so that said end length moves past stationary measurement feelers which are arranged laterally on the measurement sleeve and are operatively connected with the path detection system, and measuring and comparing the end length (13) of the measurement pin, which end length has moved past the measurement feelers in said second direction, with the desired reference length B stored in the path detection system, and initiating an alarm signal if the measured end length (13) of the measurement pin is at most the same as the stored desired reference length B.

2. An apparatus for performing the process of claim 1, comprising a measurement sleeve fixed inside the tool extending up to and normal to said outer surface, a measurement pin which is shorter than said sleeve by substantially the predetermined amount of complete abrasion of the surface of said stationary body and said measurement pin being axially displaceably mounted in said sleeve and has a free said one end, compression spring means in the sleeve for biasing said measurement pin in the second direction such that said free one end extends out of said sleeve beyond said outer surface, said rotary workpiece engaging the outer surface of the stationary tool and engaging said free one end of said measurement pin pushing said pin against the force of said compression spring means into said measurement sleeve, an electric contact disposed at an inner end of said measurement sleeve, said another end of said measurement pin contacts said electric contact when abrasion of the outer surface of the stationary body is greater than said predetermined amount, said measurement feelers are fixedly on the measuring sleeve, a distance measuring means connected to said measuring feelers for measuring the actual said end length of the measuring pin on movement of the latter in said second direction back toward its initial position for comparison with the desired reference length.

3. The apparatus as set forth in claim 2, wherein said measuring feelers constitute means for being operated by mechanical contact.

4. The apparatus as set forth in claim 2, wherein said measuring feelers constitute means for being operated inductively.

5. The apparatus as set forth in claim 2, wherein said measuring feelers constitute means for being operated capacitively.

* * * * *